US008605622B2

United States Patent
Shimonishi

(10) Patent No.: US 8,605,622 B2
(45) Date of Patent: Dec. 10, 2013

(54) ROUTE SETUP SERVER, ROUTE SETUP METHOD AND ROUTE SETUP PROGRAM

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 51 days.

(21) Appl. No.: 13/176,636

(22) Filed: Jul. 5, 2011

(65) Prior Publication Data

US 2011/0286359 A1 Nov. 24, 2011

Related U.S. Application Data

(63) Continuation of application No. PCT/JP2010/054921, filed on Mar. 23, 2010.

(30) Foreign Application Priority Data

Mar. 26, 2009 (JP) ................................. 2009-077318

(51) Int. Cl.
*H04J 1/16* (2006.01)
(52) U.S. Cl.
USPC ............ 370/254; 370/230; 370/235; 370/352
(58) Field of Classification Search
USPC ............ 370/230–235, 254, 352, 392, 393.53, 370/351, 353, 389, 237, 229, 218, 401, 370/395.2; 709/243, 245, 221–223, 230, 709/238
See application file for complete search history.

(56) References Cited

U.S. PATENT DOCUMENTS 5,903,559 A * 5/1999 Acharya et al. ............... 370/355
7,343,485 B1 * 3/2008 Huang et al. .................. 713/153
7,403,999 B2 * 7/2008 Corl et al. ..................... 709/230
7,411,957 B2 * 8/2008 Stacy et al. ................... 370/392
7,616,574 B2 * 11/2009 Previdi et al. ................. 370/238

(Continued)

FOREIGN PATENT DOCUMENTS

| CN | 1937576 A | 3/2007 |
|---|---|---|
| JP | 2007-116648 A | 5/2007 |
| JP | 2008-131346 A | 6/2008 |

OTHER PUBLICATIONS

Martin Casado et al., "Ethane: Taking Control of the Enterprise", In Proceedings of SIGCOMM 2007, Aug. 2007.

(Continued)

*Primary Examiner* — Robert Wilson
*Assistant Examiner* — Sai Aung
(74) *Attorney, Agent, or Firm* — McGinn Intellectual Property Law Group, PLLC

(57) ABSTRACT

A route setup server has a storage unit, an IP routing unit and a flow management unit. A routing determination table indicating a router node assigned to an IP router among the plurality of nodes is stored in the storage unit. The IP routing unit has a software-based IP routing module having a same function as an IP router with respect to each router node. The flow management unit refers to the routing determination table to check whether or not a requestor node of a route setup request corresponds to any router node. The IP routing unit performs packet IP routing by using the software-based IP routing module associated with the corresponding router node to update a header of the packet. After that, the requestor node of the route setup request is updated to a destination node designated by a destination MAC address of the packet. Such the processing is repeated and thus the communication route is determined.

20 Claims, 10 Drawing Sheets

(56) References Cited

U.S. PATENT DOCUMENTS

| | | |
|---|---|---|
| 7,710,872 B2 * | 5/2010 | Vasseur .................. 370/230 |
| 7,746,789 B2 | 6/2010 | Katoh et al. |
| 2002/0085565 A1 * | 7/2002 | Ku et al. .................. 370/395.42 |
| 2004/0098485 A1 * | 5/2004 | Larson et al. .................. 709/227 |
| 2005/0213570 A1 | 9/2005 | Stacy et al. |
| 2006/0092861 A1 * | 5/2006 | Corday et al. .................. 370/256 |
| 2006/0203808 A1 * | 9/2006 | Zhang et al. .................. 370/352 |
| 2007/0133406 A1 | 6/2007 | Vasseur |
| 2007/0195700 A1 * | 8/2007 | Katoh et al. .................. 370/235 |
| 2008/0086574 A1 * | 4/2008 | Raciborski et al. .......... 709/245 |

OTHER PUBLICATIONS http://www.cse.wustl.edu/~7Ejain/atm/atm_mpoa.htm, "Multiprotocol over ATM (MPOA)" (downloaded Mar. 26, 2009).

Chinese Notification of First Office Action and Search Report Aug. 29, 2013 with partial English translation thereof.

\* cited by examiner

Fig. 4

320:ROUTING DETERMINATION TABLE

| ID | PORT | MAC ADDRESS | IP ADDRESS |
|---|---|---|---|
| #2 | P20 | MAC20 | IP20 |
| #2 | P21 | MAC21 | IP21 |
| #5 | P50 | MAC50 | IP50 |
| #5 | P51 | MAC51 | IP51 |
| #7 | P70 | MAC70 | IP70 |
| #7 | P71 | MAC71 | IP71 |

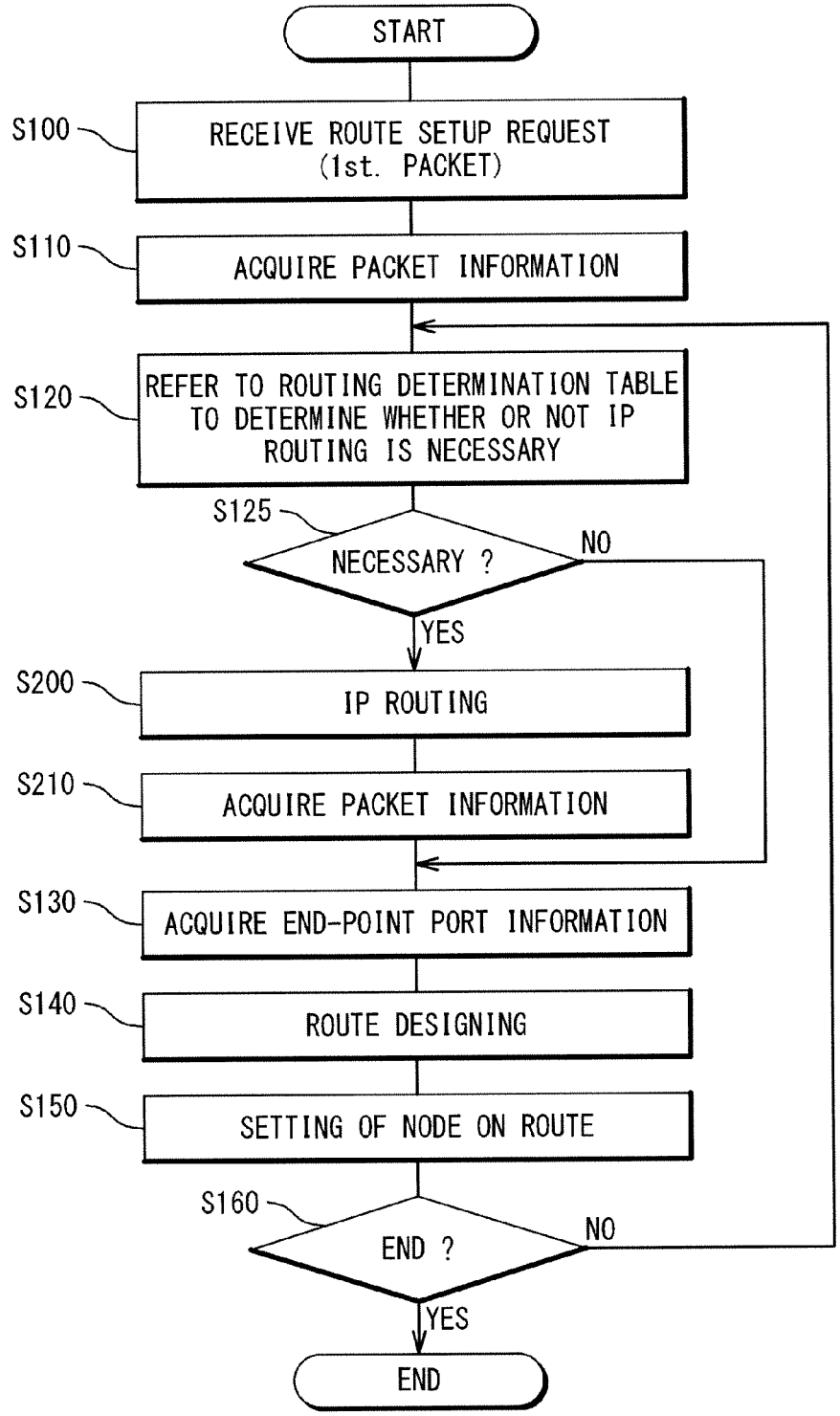

Fig. 6

| PROCESSING | | PACKET HEADER | | | | START-POINT | END-POINT | FLOW ID INFORMATION |
|---|---|---|---|---|---|---|---|---|
| | | MAC-DA | MAC-SA | IP-DA | IP-SA | IP, Port | IP, Port | |
| PROC1 | S110 | MAC20 | MAC01 | IP90 | IP01 | #1, P10 | | MAC20←MAC01, IP90←IP01 |
| | S130 | MAC20 | MAC01 | IP90 | IP01 | #1, P10 | #2, P20 | MAC20←MAC01, IP90←IP01 |
| | CONTINUE | MAC20 | MAC01 | IP90 | IP01 | #2, P20 | | MAC20←MAC01, IP90←IP01 |
| PROC2 | S200–S210 | MAC50 | MAC21 | IP90 | IP01 | #2, P21 | | MAC50←MAC21, IP90←IP01 |
| | S130 | MAC50 | MAC21 | IP90 | IP01 | #2, P21 | #5, P50 | MAC50←MAC21, IP90←IP01 |
| | CONTINUE | MAC50 | MAC21 | IP90 | IP01 | #5, P50 | | MAC50←MAC21, IP90←IP01 |
| PROC3 | S200–S210 | MAC70 | MAC51 | IP90 | IP01 | #5, P51 | | MAC70←MAC51, IP90←IP01 |
| | S130 | MAC70 | MAC51 | IP90 | IP01 | #5, P51 | #7, P70 | MAC70←MAC51, IP90←IP01 |
| | CONTINUE | MAC70 | MAC51 | IP90 | IP01 | #7, P70 | | MAC70←MAC51, IP90←IP01 |
| PROC4 | S200–210 | MAC90 | MAC71 | IP90 | IP01 | #7, P71 | | MAC90←MAC71, IP90←IP01 |
| | S130 | MAC90 | MAC71 | IP90 | IP01 | #7, P71 | #7, P71 | MAC90←MAC71, IP90←IP01 |

10: ROUTE SETUP SERVER

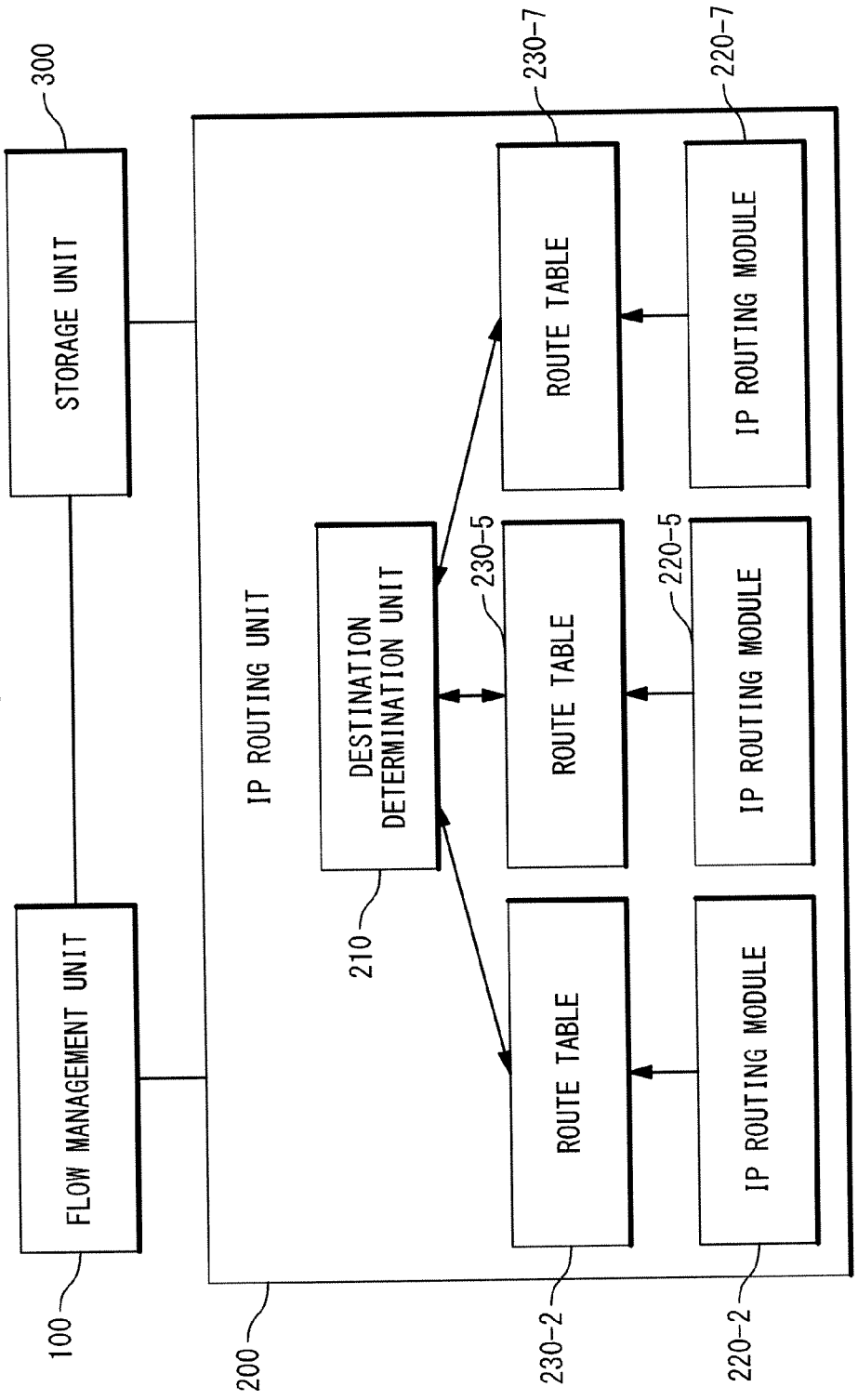

ROUTE SETUP SERVER, ROUTE SETUP METHOD AND ROUTE SETUP PROGRAM

CROSS-REFERENCE TO RELATED APPLICATION

This is a continuation of International Application No. PCT/JP2010/054921, filed on Mar. 23, 2010.

TECHNICAL FIELD

The present invention relates to a technique that sets up a communication route of a flow in a communication network by using a route setup server.

BACKGROUND ART

A communication network system in which a management server performs centralized management of a communication network including a plurality of nodes is known. The management server, when receiving a route setup request regarding a certain flow, sets up a communication route of the flow in the communication network. Such the management server that sets up the communication route of the flow is hereinafter also referred to as a "route setup server". Techniques regarding the route setup server are described, for example, in Patent Literature 1 (Japanese Patent Publication JP-2008-131346) and Non-Patent Literature 1 (Martin Casado et al., "Ethane: Taking Control of the Enterprise", In Proceedings of SIGCOMM 2007.).

For example, a certain terminal starts transmission of packets of a new flow. When a first packet arrives at a first node, the first node does not know a forwarding destination of the received packet. Therefore, the first node transmits the received packet as a route setup request to a route setup server. In response to the route setup request, the route setup server determines a transfer route of the packets of the new flow. Then, the route setup server instructs each node on the determined transfer route to forward the packets along the determined transfer route. As a result, each node becomes able to forward packets of the same flow along the designated transfer route. Thereafter, communication of the flow is performed without through the route setup server.

Here, let us consider a case of performing the route setup for a flow extending across a plurality of subnets. In this case, not only the route setup within each subnet but also the route setup between subnets needs to be performed. For example, in a case of a network composed of Layer 2 and IP, routing within each subnet is performed by the Layer 2 and routing between subnets is performed by the IP.

Non-Patent Literature 2 (http://www.cse.wustl.edu/~7Ejain/atm/atm_mpoa.htm, "Multiprotocol over ATM (MPOA)") describes an MPOA (Multi-Protocol Over ATM) technique. According to the MPOA technique, the route setup request namely the first packet of a communication flow is actually communicated between routers. When the packet arrives at an exit of the network, a route of the flow is set up based on the route through which the packet actually has gone.

CITATION LIST

Patent Literature
  [Patent Literature 1] Japanese Patent Publication JP-2008-131346

Non Patent Literature
  [Non-Patent Literature 1] Martin Casado et al., "Ethane: Taking Control of the Enterprise", In Proceedings of SIGCOMM 2007.
  [Non-Patent Literature 2] http://www.cse.wustl.edu/to7Ejain/atm/atm_mpoa.htm, "Multiprotocol over ATM (MPGA)"

SUMMARY OF INVENTION

In the case of performing the route setup for a flow extending across a plurality of subnets, it has been necessary to determine an entire communication route with exchanging information between route setup servers administering the respective subnets. However, this causes increase in the number of route setup servers and a time required for the route setup.

An object of the present invention is to provide a technique that can aggregate the route setup server for performing the route setup for a flow extending across a plurality of subnets.

In an aspect of the present invention, a route setup server that determines a communication route in a communication network including a plurality of nodes is provided. The route setup server has a storage unit, an IP routing unit and a flow management unit. A routing determination table that indicates a router node assigned to an IP router among the plurality of nodes is stored in the storage unit. The IP routing unit has a software-based IP routing module having a same function as an IP router, with respect to each router node. The flow management unit receives a packet indicating a source IP address and a destination IP address of a flow as a route setup request and determines a communication route of the flow in response to the route setup request. In routing processing, the flow management unit refers to the routing determination table to check whether or not a requestor node of the route setup request corresponds to any router node. If the requestor node corresponds to any router node, the IP routing unit performs IP routing for the packet by using the software-based IP routing module associated with the corresponding router node to update a header of the packet. After the routing processing, the flow management unit updates the requestor node of the route setup request to a destination node designated by a destination MAC address of the packet. The flow management unit determines the communication route by repeating the routing processing.

In another aspect of the present invention, a communication network system is provided. The communication network system has: a communication network including a plurality of nodes; and a route setup server configured to determine a communication route in the communication network. The route setup server has a storage unit, an IP routing unit and a flow management unit. A routing determination table that indicates a router node assigned to an IP router among the plurality of nodes is stored in the storage unit. The IP routing unit has a software-based IP routing module having a same function as an IP router, with respect to each router node. The flow management unit receives a packet indicating a source IP address and a destination IP address of a flow as a route setup request and determines a communication route of the flow in response to the route setup request. In routing processing, the flow management unit refers to the routing determination table to check whether or not a requestor node of the route setup request corresponds to any router node. If the requestor node corresponds to any router node, the IP routing unit performs IP routing for the packet by using the software-based IP routing module associated with the corresponding router node to update a header of the packet. After the routing processing, the flow management unit updates the requestor node of the route setup request to a destination node designated by a destination MAC address of the packet. The flow management unit determines the communication route by repeating the routing processing.

In still another aspect of the present invention, a route setup method that determines a communication route in a communication network including a plurality of nodes is provided. The route setup method includes: (A) storing a routing determination table that indicates a router node assigned to an IP router among the plurality of nodes, in a memory device; (B) receiving a packet indicating a source IP address and a destination IP address of a flow as a route setup request; and (C) determining a communication route of the flow in response to the route setup request. A software-based IP routing module having a same function as an IP router is provided with respect to each router node. The above-mentioned (C) Step includes: (C1) performing routing processing. The routing processing includes: (a) checking whether or not a requestor node of the route setup request corresponds to any router node, by referring to the routing determination table; and (b) performing, if the requestor node corresponds to any router node, IP routing for the packet by using the software-based IP routing module associated with the corresponding router node to update a header of the packet. The above-mentioned (C) Step further includes: (C2) updating, after the routing processing, the requestor node of the route setup request to a destination node designated by a destination MAC address of the packet; and (C3) determining the communication route by repeating the routing processing.

In still another aspect of the present invention, a route setup program recorded on a tangible computer-readable medium that, when executed, causes a computer to perform route setup processing that determines a communication route in a communication network including a plurality of nodes is provided. The route setup processing includes: (A) storing a routing determination table that indicates a router node assigned to an IP router among the plurality of nodes, in a memory device; (B) receiving a packet indicating a source IP address and a destination IP address of a flow as a route setup request; and (C) determining a communication route of the flow in response to the route setup request. A software-based IP routing module having a same function as an IP router is provided with respect to each router node. The above-mentioned (C) Step includes: (C1) performing routing processing. The routing processing includes: (a) checking whether or not a requestor node of the route setup request corresponds to any router node, by referring to the routing determination table; and (b) performing, if the requestor node corresponds to any router node, IP routing for the packet by using the software-based IP routing module associated with the corresponding router node to update a header of the packet. The above-mentioned (C) Step further includes: (C2) updating, after the routing processing, the requestor node of the route setup request to a destination node designated by a destination MAC address of the packet; and (C3) determining the communication route by repeating the routing processing.

According to the present invention, it is possible to aggregate the route setup server for performing the route setup for a flow extending across a plurality of subnets.

BRIEF DESCRIPTION OF DRAWINGS

The above and other objects, advantages and features of the present invention will be more apparent from the following description of certain exemplary embodiments taken in conjunction with the accompanying drawings.

FIG. 4 shows an example of a routing determination table.

FIG. 5 is a flow chart showing a route setup method according to a first exemplary embodiment of the present invention.

FIG. 6 shows an example of flow management information.

FIG. 10 is a block diagram showing a configuration of a route setup server according to a fourth exemplary embodiment of the present invention.

DESCRIPTION OF EMBODIMENTS

Exemplary embodiments of the present invention will be described with reference to the attached drawings.

Figure 1:
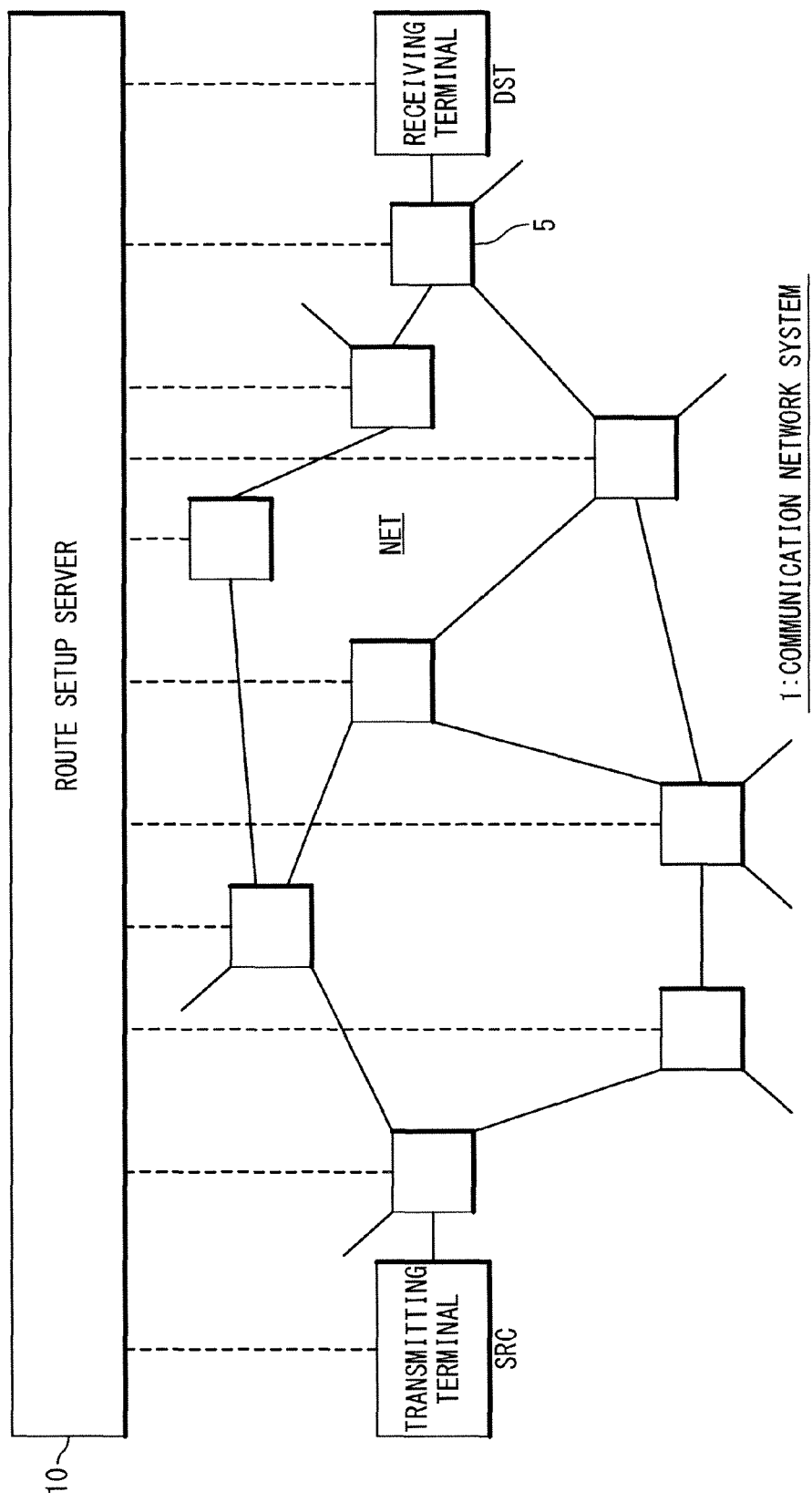
FIG. 1 is a block diagram schematically showing a communication network system according to an exemplary embodiment of the present invention.

FIG. 1 is a schematic diagram showing a communication network system 1 according to the present exemplary embodiment. The communication network system 1 has a communication network NET and a route setup server 10. The communication network NET includes a plurality of terminals and a plurality of nodes 5.

The route setup server 10 is a management server (management computer) that performs centralized management of the communication network NET and is able to bi-directionally communicate with the respective nodes 5. In particular, the route setup server 10 determines a communication route of a flow in the communication network NET. More specifically, when a certain flow occurs, the route setup server 10 receives a route setup request regarding the flow from the communication network NET. In response to the route setup request, the route setup server 10 determines a communication route of the flow.

When the communication route is determined, the route setup server 10 instructs each node 5 on the determined communication route to forward packets of the flow along the determined communication route. Each node 5 performs setting of itself in accordance with the instruction.

For example, each node 5 is provided with a forwarding table. The forwarding table is a table that indicates a correspondence relationship between input sources and forwarding destinations of the packets. Each node 5 can forward a packet received from an input source to a designated forwarding destination, by referring to the forwarding table. In this case, the route setup server 10 instructs each node 5 to set up the forwarding table such that the packet is forwarded along the determined communication route. Each node 5 sets up contents of its own forwarding table in accordance with the instruction from the route setup server 10.

Various interfaces are possible as an interface between the route setup server 10 and the nodes 5 for achieving the processing described above. For example, Openflow (refer to http://www.openflowswitch.org/) is applicable. In this case, an "Openflow Controller" serves as the route setup server 10 and an "Openflow Switch" serves as each node 5. It is possible to set up the forwarding table by using "Secure Channel" of the Openflow.

In the present exemplary embodiment, some node 5 in the communication network NET is so set as to function and operate as an "IP router". Such the setting is possible by an instruction from the route setup server 10 (management server). The node 5 that functions and operates as an IP router is hereinafter referred to as a "router node". Which node 5 is assigned to the router node can be arbitrarily determined by a used. That is, it is possible to freely allocate (designate) an arbitrary node 5 in the communication network NET to the router node. This means that subnets are not fixed but can be set depending on a user's needs in the communication network NET.

The route setup server 10 according to the present exemplary embodiment performs route setup for a flow extending across a plurality of subnets in the communication network NET. It should be noted that the route setup processing according to the present exemplary embodiment is achieved by the route setup server 10 executing a route setup program. The route setup program is a computer program executed by the route setup server 10 and may be recorded on a tangible computer-readable recording medium.

Figure 2:
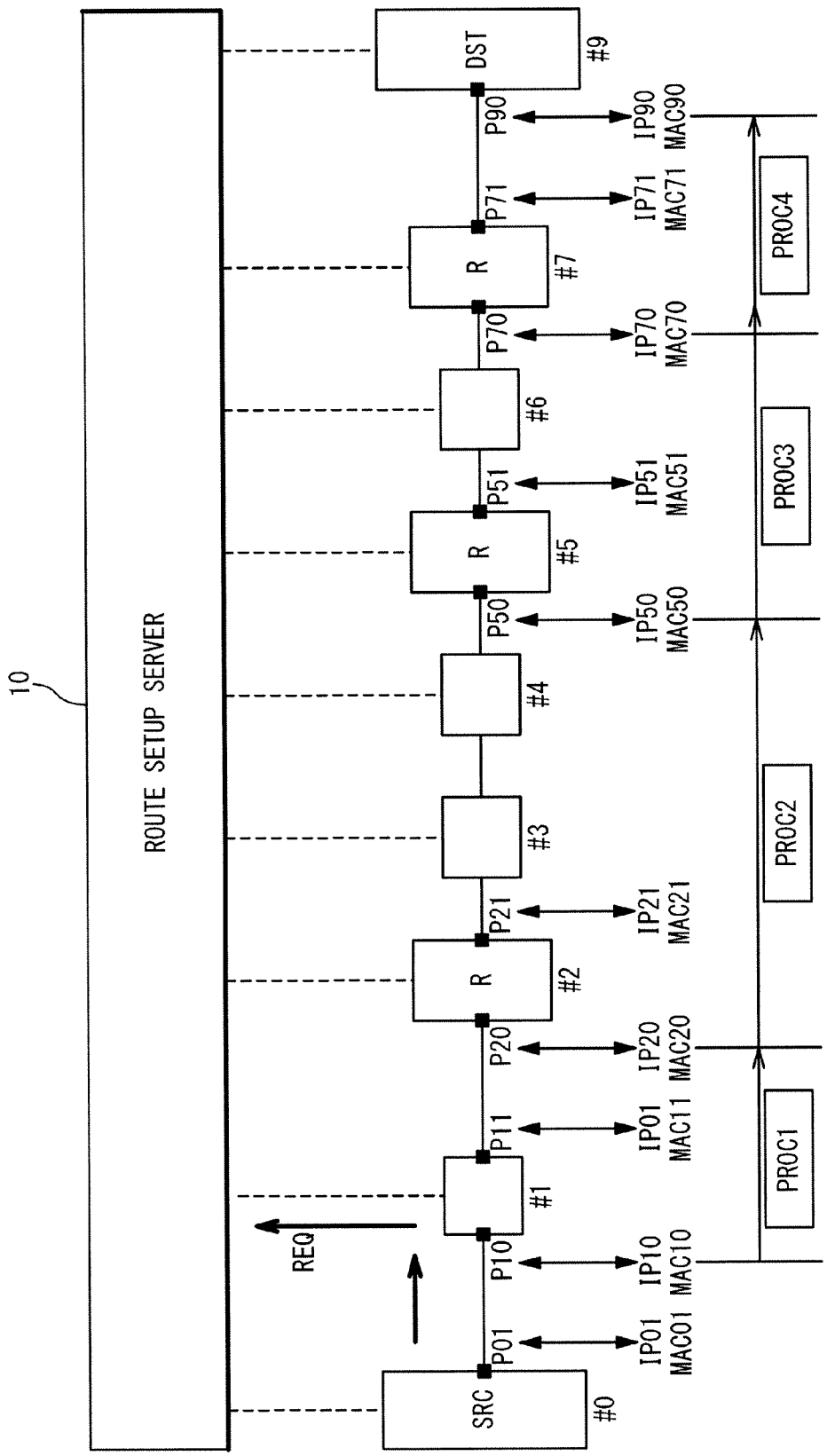
FIG. 2 is a conceptual diagram for explaining an example of route setup processing in an exemplary embodiment of the present invention.

FIG. 2 is a diagram for explaining an example of the route setup processing in the present exemplary embodiment. Shown in FIG. 2 are a transmitting terminal SRC (ID=#0), a node 5-1 (ID=#1), a node 5-2 (ID=#2), a node 5-3 (ID=#3), a node 5-4 (ID=#4), a node 5-5 (ID=#5), a node 5-6 (ID=#6), a node 5-7 (ID=#7) and a receiving terminal DST (ID=#9). The node 5-2 (ID=#2), the node 5-5 (ID=#5) and the node 5-7 (ID=#7) among them are the above-mentioned "router nodes" and denoted by "R" in the diagram. The other nodes 5 function and operate as L2 switches.

The transmitting terminal SRC (ID=#0) has a port P01. An IP address and a MAC address of the port P01 are IP01 and MAC01, respectively. The receiving terminal DST (ID=#9) has a port P90. An IP address and a MAC address of the port P90 are IP90 and MAC90, respectively.

The node 5-1 (ID=#1) being the L2 switch has ports P10 and P11. An IP address and a MAC address of the port P10 are IP10 and MAC10, respectively. An IP address and a MAC address of the port P11 are IP11 and MAC11, respectively.

The node 5-2 (ID=#2) being the router node has ports P20 and P21. An IP address and a MAC address of the port P20 are IP20 and MAC20, respectively. An IP address and a MAC address of the port P21 are IP21 and MAC21, respectively.

The node 5-5 (ID=#5) being the router node has ports P50 and P51. An IP address and a MAC address of the port P50 are IPSO and MAC50, respectively. An IP address and a MAC address of the port P51 are IP51 and MAC51, respectively.

The node 5-7 (ID=#7) being the router node has ports P70 and P71. An IP address and a MAC address of the port P70 are IP70 and MAC70, respectively. An IP address and a MAC address of the port P71 are IP71 and MAC71, respectively.

Let us consider a new flow from the transmitting terminal SRC to the receiving terminal DST. The transmitting terminal SRC starts transmission of packets of the new flow. First, the transmitting terminal SRC transmits a first packet from the port P01 toward the node 5-1. In the packet, a destination MAC address is "MAC20", a source MAC address is "MAC01", a destination IP address is "IP90" and a source IP address is "IP01".

The node 5-1 receives the first packet from the port P10. At this time, the node 5-1 does not know the forwarding destination of the received packet. Therefore, the node 5-1 transmits the received packet as a "route setup request REQ" to the route setup server 10. The route setup server 10 receives the route setup request REQ. In response to the route setup request REQ, the route setup server 10 determines a communication route of the new flow extending across the plurality of subnets. Hereinafter, the route setup processing according to the present exemplary embodiment will be described in detail, based on the example shown in FIG. 2.

1. First Exemplary Embodiment 1-1. Configuration

Figure 3:
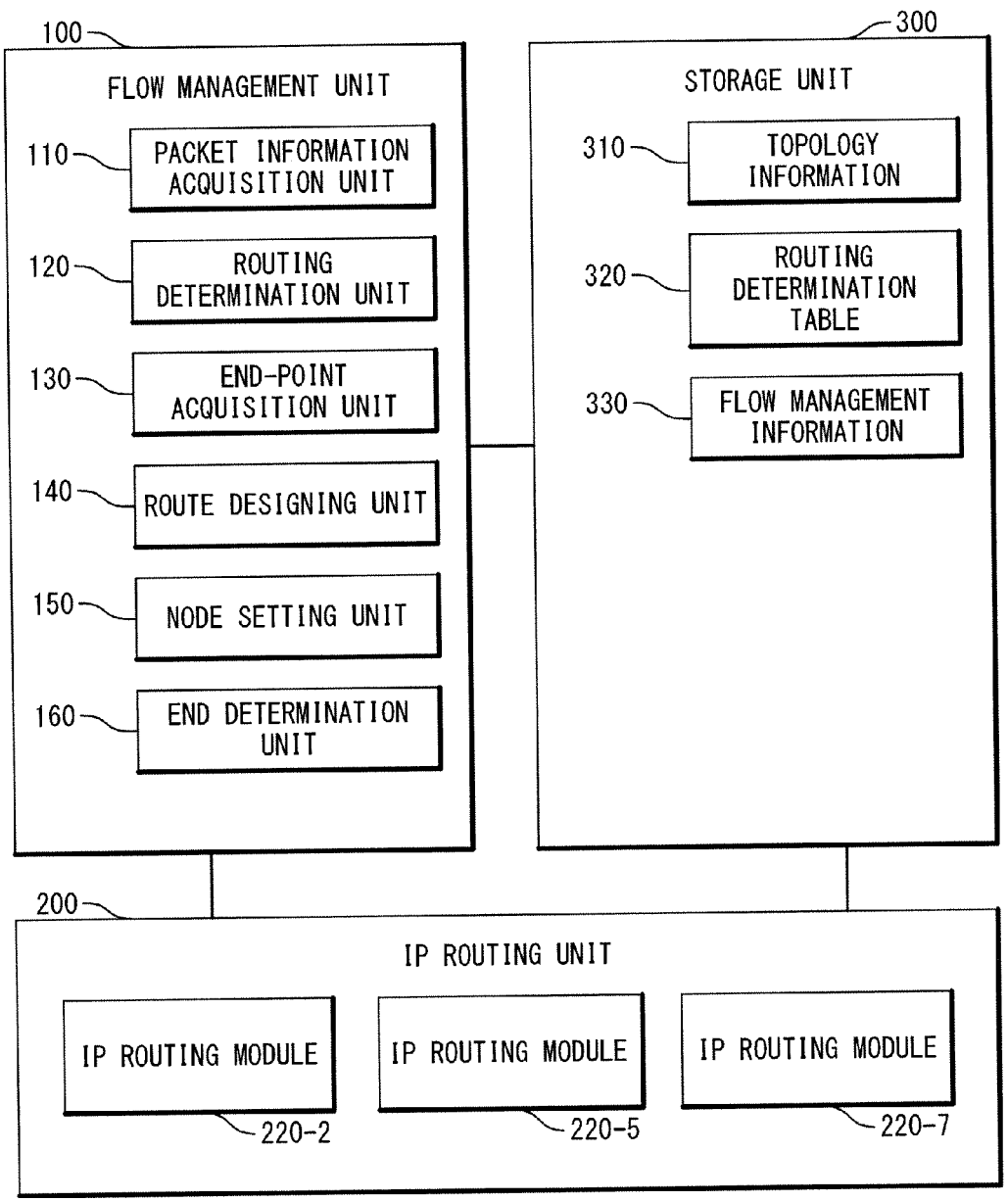
FIG. 3 is a block diagram showing a configuration of a route setup server according to a first exemplary embodiment of the present invention.

FIG. 3 is a block diagram showing a configuration of the route setup server 10 according to a first exemplary embodiment. The route setup server 10 has a flow management unit 100, an IP routing unit 200 and a storage unit 300.

The flow management unit 100 receives the route setup request REQ and determines a communication route of the flow in response to the route setup request REQ. The flow management unit 100 is achieved by the route setup server 10 executing the route setup program. As shown in FIG. 3, the flow management unit 100 has a packet information acquisition unit 110, a routing determination unit 120, an end-point acquisition unit 130, a route designing unit 140, a node setting unit 150 and an end determination unit 160 as functional blocks. Processing by each functional block will be described later.

The IP routing unit 200 performs IP routing in a software manner. More specifically, the IP routing unit 200 has a software-based IP routing module 220. The IP routing module 220 is a well-known functional block that has a same function as a typical IP router. In the present exemplary embodiment, the IP routing module 220 is provided with respect to each router node mentioned above. That is, the IP routing unit 200 has an IP routing module 220-2 corresponding to the router node 5-2 (ID=#2), an IP routing module 220-5 corresponding to the router node 5-5 (ID=#5) and an IP routing module 220-7 corresponding to the router node 5-7 (ID=#7). When performing the route setup extending across the subnets, the IP routing unit 200 receives a packet and performs address resolution for the packet by using an appropriate IP routing module 220. It should be noted that the IP routing unit 200 is achieved by the route setup server 10 executing the route setup program.

The storage unit 300 is a memory device such as a RAM and an HDD. Topology information 310, a routing determination table 320, flow management information 330 and the like are stored in the storage unit 300.

The topology information 310 indicates a connection state between nodes and terminals, namely, a physical topology of the communication network NET. More specifically, the topology information 310 indicates the IDs and port numbers of a start-point and an end-point of each link. It is possible by referring to the topology information 310 to recognize which port is connected to which port.

The routing determination table 320 is a table which is referred to when determining whether or not to perform the IP routing by using the above-mentioned IP routing module 220. The routing determination table 320 indicates at least the router nodes 5-2, 5-5 and 5-7. FIG. 4 shows an example of the routing determination table 320. In the example shown in FIG. 4, the routing determination table 320 has entries regarding the router nodes 5-2, 5-5 and 5-7. Each entry indicates a correspondence relationship between the ID, the port number, the MAC address and the IP address.

The flow management information 330 is created, referred to and updated in the route setup processing described below.

1-2. Route setup processing

FIG. 5 is a flow chart showing the route setup processing according to the present exemplary embodiment.

FIG. 6 shows an example of the flow management information 330. In the case of the example shown in FIG. 2, the route setup processing is divided into four stages of processing PROC1 to PROC4, as described below.

(Processing PROC1)

As described above, the node 5-1 receives the first packet from the port P10. A header of the packet indicates "destination MAC address=MAC20, source MAC address=MAC01, destination IP address=IP90, source IP address=IP01". At this time, the node 5-1 does not know the forwarding destination of the received packet. Therefore, the node 5-1 transmits the received packet as a route setup request REQ to the route setup server 10. That is, the node 5-1 becomes an initial requestor node of the route setup request REQ.

At Step S100, the flow management unit 100 receives the route setup request REQ (first packet) from the requestor node 5-1. Also, the flow management unit 100 recognizes, through a channel with the requestor node 5-1, the ID #1 and the port P10 of the node 5-1 to which the first packet is input. The start-point port information "ID=#1, port=P10" as shown in FIG. 6 is used for identifying the requestor node 5-1 that is a "start-point" of route designing.

At Step S110, the packet information acquisition unit 110 extracts the packet header from the route setup request REQ. Then, the packet information acquisition unit 110 records the extracted packet header as flow ID information on the flow management information 330. As shown in FIG. 6, the flow ID information here is "destination MAC address=MAC20, source MAC address=MAC01, destination IP address=IP90, source IP address=IP01". It should be noted that the flow ID information is identification information for identifying the flow.

Next, the flow management unit 100 performs "routing processing". Here, routing in the Layer 2 is necessary within a subnet while IP routing is necessary when straddling subnets. Therefore, the flow management unit 100 first determines whether or not to perform the IP routing by the use of the IP routing module 220.

More specifically, at Step S120, the routing determination unit 120 refers to the routing determination table 320 shown in FIG. 4 to check whether or not the requestor node of the route setup request REQ corresponds to any of the router nodes. If the requestor node corresponds to any of the router nodes, the IP routing is performed. On the other hand, if the requestor node does not correspond to any router node, the IP routing is not performed.

In the current processing PROC1, the requestor node of the route setup request REQ is the node 5-1. The requestor node 5-1 can be identified by the start-point port information "ID=#1, port=P10" shown in FIG. 6, as mentioned above. However, the routing determination table 320 shown in FIG. 4 does not have an entry associated with "ID=#1, port=P10". That is, the current requestor node 5-1 is not the router node. Therefore, the routing determination unit 120 determines not to perform the IP routing (Step S125; No). In this case, the processing proceeds to Step S130.

At Step S130, the end-point acquisition unit 130 sets the destination node designated by the destination MAC address of the packet as an "end-point" of route designing. Currently, the destination MAC address of the packet is "MAC20". The end-point acquisition unit 130 refers to the routing determination table 320 shown in FIG. 4 to acquire end-point port information "ID=#2, port=P20" associated with the "MAC address=MAC20". The end-point port information "ID=#2, port=P20" as shown in FIG. 6 is used for identifying the destination node 5-2 that is the "end-point" of route designing.

After the routing processing is performed in this manner, the flow management unit 100 subsequently performs route designing. More specifically, at Step S140, the route designing unit 140 designs and determines a "partial route" that is a communication route from the requestor node 5-1 as the start-point of the route designing to the destination node 5-2 as the end-point of the route designing. As described above, the requestor node 5-1 is identified by the start-point port information "ID=#1, port=P10", and the destination node 5-2 is identified by the end-point port information "ID=#2, port=P20". Therefore, the route designing unit 140 can determine the partial route by referring to the topology information 310.

Subsequently, at Step S150, the node setting unit 150 sets up each node on the determined route. More specifically, the node setting unit 150 instructs each node 5 on the determined route to forward packets of the flow along the determined route. The flow is identified by the flow ID information shown in FIG. 6. The node setting unit 150 transmits a forwarding table setting command including the flow ID information to each node 5 on the determined route. The forwarding table setting command is a command that instructs to set the forwarding table such that the packets of the flow are forwarded along the determined route. Each node 5 sets up contents of its own forwarding table in accordance with the received forwarding table setting command. As a result, the packets of the flow come to be transferred from the requestor node 5-1 to the destination node 5-2.

Next, at Step S160, the end determination unit 160 determines whether or not the destination node satisfies a predetermined end condition. The predetermined end condition is that the destination node is the receiving terminal DST or that the destination node goes out of jurisdiction by the route setup server 10. The current destination node 5-2 is identified by the end-point port information "ID=#2, port=P20". The end determination unit 160 refers to the routing determination table 320 to check whether or not the "ID=#2, port=P20" corresponds to "destination IP address=IP90". Also, the end determination unit 160 refers to the topology information 310 to check whether or not the "ID=#2, port=P20" is out of jurisdiction.

In the current processing PROC1, the end condition is not satisfied (Step S160; No). In this case, the end determination unit 160 runs the next routing processing. For that purpose, the end determination unit 160 updates the requestor node of the route setup request REQ to the current destination node 5-2. After that, the processing returns back to the Step S120.

(Processing PROC2)

In processing PROC2, the requestor node of the route setup request REQ is the node 5-2. As shown in FIG. 6, the requestor node 5-2 is identified by the start-point port information "ID=#2, port=P20".

At Step S120, the routing determination unit 120 refers to the routing determination table 320 to check whether or not the requestor node 5-2 corresponds to any of the router nodes. At this time, the routing determination table 320 has an entry "ID=#2, port=P20, MAC address=MAC20, IP address=IP20" as shown in FIG. 4. That is, the current requestor node 5-2 corresponds to the router node 5-2. Therefore, the routing determination unit 120 determines to perform the IP routing (Step S125; Yes). In this case, the routing determination unit 120 sends the route setup request REQ (packet) and the IP address information "IP address=IP20" to the IP routing unit 200.

Figure 7:
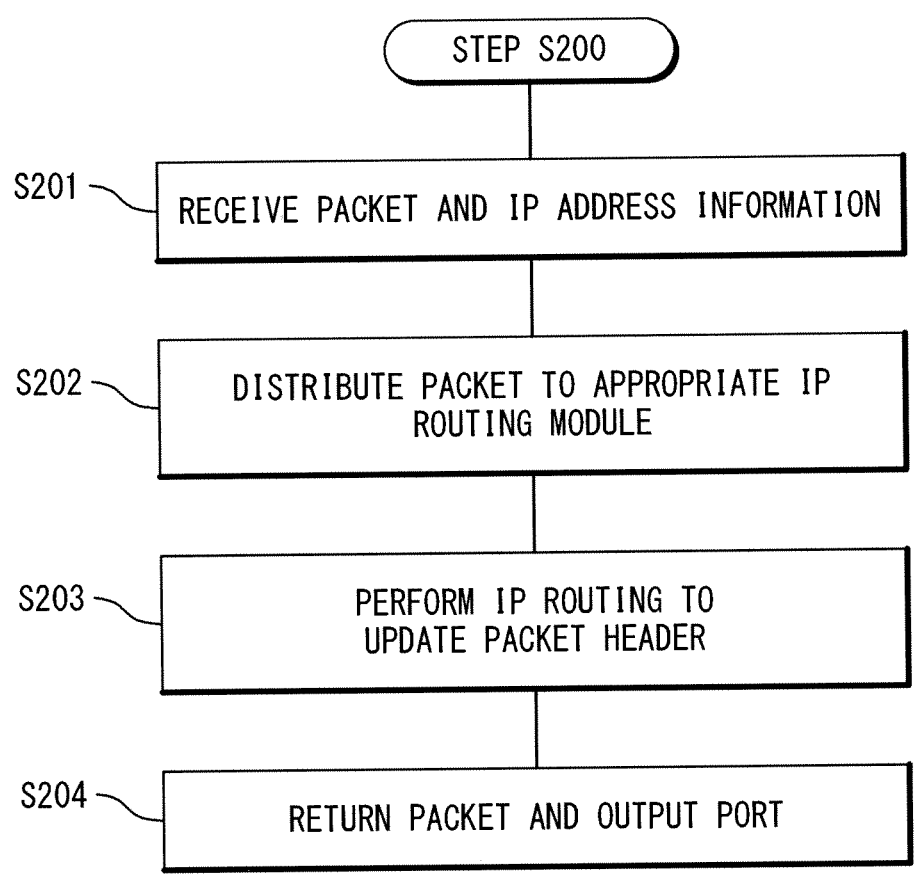
FIG. 7 is a flow chart showing Step S200 in the first exemplary embodiment of the present invention.

At Step S200, the IP routing unit 200 performs the IP routing (address resolution) for the given packet by using an appropriate IP routing module 220. FIG. 7 is a flow chart showing the Step S200.

At Step S201, the IP routing unit 200 receives the packet and the IP address information from the flow management unit 100.

Next, at Step S202, the IP routing unit 200 refers to the IP address information to distribute the packet to an appropriate IP routing module 220. Currently, the IP address information indicates the IP address of the router node 5-2 (ID=#2). Therefore, the IP routing unit 200 distributes the packet to the IP routing module 220-2 associated with the router node 5-2 (ID=#2).

Next, at Step S203, the IP routing module 220-2 performs the IP routing for the given packet as in the case of a typical IP router. Then, the IP routing module 220-2 determines an output port of the packet and updates the MAC header of the packet. In the present example, the destination MAC address of the packet becomes "MAC50", the source MAC address becomes "MAC21" and the output port becomes "P21".

After that, at Step S204, the IP routing unit 200 returns the post-update packet and the output port information (P21) to the flow management unit 100.

Returning back to FIG. 5, at Step S210, the flow management unit 100 receives the post-update packet and the output port information. The start-point port information for identifying the requestor node 5-2 is changed to "ID=#2, port=P21". Moreover, the packet information acquisition unit 110 extracts the packet header and updates the flow ID information. As shown in FIG. 6, the flow ID information here is "destination MAC address=MAC50, source MAC address=MAC21, destination IP address=IP90, source IP address=IP01". After that, the processing proceeds to Step S130.

The processing after Step S130 is the same as in the case of the processing PROC1. At Step S130, the end-point acquisition unit 130 refers to the routing determination table 320 to acquire the end-point port information "ID=#5, port=P50" associated with the "MAC address=MAC50". At Step S140, the route designing unit 140 designs and determines a partial route from the requestor node 5-2 to the destination node 5-5.

At Step S150, the node setting unit 150 instructs each node 5 on the determined route to forward packets of the flow along the determined route. It should be noted that the packet header is updated in the processing PROC2. Therefore, the node setting unit 150 further instructs the router node 5-2 to, when receiving a packet of the flow, rewrite the header of the received packet.

Next, at Step S160, the end determination unit 160 determines whether or not the destination node 5-5 satisfies the predetermined end condition. In the current processing PROC2, the end condition is not satisfied (Step S160; No). In this case, the end determination unit 160 runs the next routing processing. For that purpose, the end determination unit 160 updates the requestor node of the route setup request REQ to the current destination node 5-5. After that, the processing returns back to the Step S120.

(Processing PROC3)

The processing PROC3 proceeds in a similar manner to the above-mentioned processing PROC2. In the processing PROC3, the requestor node of the route setup request REQ is the node 5-5. At Step S120, the routing determination unit 120 determines to perform the IP routing (Step S125; Yes).

At Step S200, the IP routing unit 200 performs the IP routing by the use of the IP routing module 220-5. As a result of the IP routing, the destination MAC address of the packet becomes "MAC70", the source MAC address becomes "MAC51" and the output port becomes "P51". At Step S210, the flow ID information is updated to "destination MAC address=MAC70, source MAC address=MAC51, destination IP address=IP90, source IP address=IP01".

At Step S130, the end-point acquisition unit 130 refers to the routing determination table 320 to acquire the end-point port information "ID=#7, port=P70" associated with the "MAC address=MAC70". At Step S140, the route designing unit 140 designs and determines a partial route from the requestor node 5-5 to the destination node 5-7. At Step S150, the node setting unit 150 instructs each node 5 on the determined route to forward packets of the flow along the determined route. Moreover, the node setting unit 150 instructs the router node 5-5 to rewrite the header of the packet of the flow.

Next, at Step S160, the end determination unit 160 determines whether or not the destination node 5-7 satisfies the predetermined end condition. In the current processing PROC3, the end condition is not satisfied (Step S160; No). In this case, the end determination unit 160 runs the next routing processing. For that purpose, the end determination unit 160 updates the requestor node of the route setup request REQ to the current destination node 5-7. After that, the processing returns back to the Step S120.

(Processing PROC4)

The processing PROC4 proceeds in a similar manner to the above-mentioned processing PROC2. In the processing PROC4, the requestor node of the route setup request REQ is the node 5-7. At Step S120, the routing determination unit 120 determines to perform the IP routing (Step S125; Yes).

At Step S200, the IP routing unit 200 performs the IP routing by the use of the IP routing module 220-7. As a result of the IP routing, the destination MAC address of the packet becomes "MAC90", the source MAC address becomes "MAC71" and the output port becomes "P71". At Step S210, the flow ID information is updated to "destination MAC address=MAC90, source MAC address=MAC71, destination IP address=IP90, source IP address=IP01".

It should be noted that each IP routing module 220 has a table that indicates a correspondence relationship between the IP address, the MAC address and the port with regard to a configuration within the same subnet. At Step S200, the IP routing module 220-7 recognizes that the receiving terminal DST as the destination of the flow exists within the same subnet. Therefore, the flow management unit 100 recognizes that the end condition is satisfied.

At Step S130, the end-point acquisition unit 130 sets the end-point port information to "ID=#7, port=P71". At Step S140, the route designing unit 140 determines a partial route. At Step S150, the node setting unit 150 instructs the route node 5-7 to forward packets of the flow along the determined route. Moreover, the node setting unit 150 instructs the router node 5-7 to rewrite the header of the packet of the flow. Lastly, since the end condition is satisfied (Step S160; Yes), the route setup processing according to the present exemplary embodiment is completed.

In this manner, the flow management unit 100 and the IP routing unit 200 determine the communication route of the flow by repeating the routing processing until the predetermined end condition is satisfied. In the present exemplary embodiment, the determining of the partial route (Step S140) and the node setting on the determined route (Step S150) are performed every time the routing processing is performed.

1-3. Effects

In the case of performing the route setup for a flow extending across a plurality of subnets, it has been necessary to determine an entire communication route with exchanging information between route setup servers administering the respective subnets. However, this causes increase in the number of route setup servers and a time required for the route setup. According to the present exemplary embodiment, the route setup for a flow extending across a plurality of subnets can be achieved by a single route setup server 10. That is, it is possible to aggregate the route setup server for performing the route setup for a flow extending across a plurality of subnets. Thus, a time and costs required for the route setup are reduced.

If the route setup server is provided with respect to each subnet, the number and a range of subnets are fixed and it is difficult to dynamically change them. Whereas, according to the present exemplary embodiment, there is no need to fix the number and a range of subnets, because it is possible by the single route setup server 10 to perform the route setup for a flow extending across a plurality of subnets. In other words, it is possible according to the present exemplary embodiment to designate an arbitrary node 5 as the router node to dynamically change the number and a range of subnets.

2. Second Exemplary Embodiment

In the above-described first exemplary embodiment, the route determination (Step S140) and the node setting (Step S150) are performed every time the routing processing is performed. According to a second exemplary embodiment, the route determination (Step S140) and the node setting (Step S150) are performed in a lump after the routing processing is repeated until the predetermined end condition is satisfied.

Figure 8:
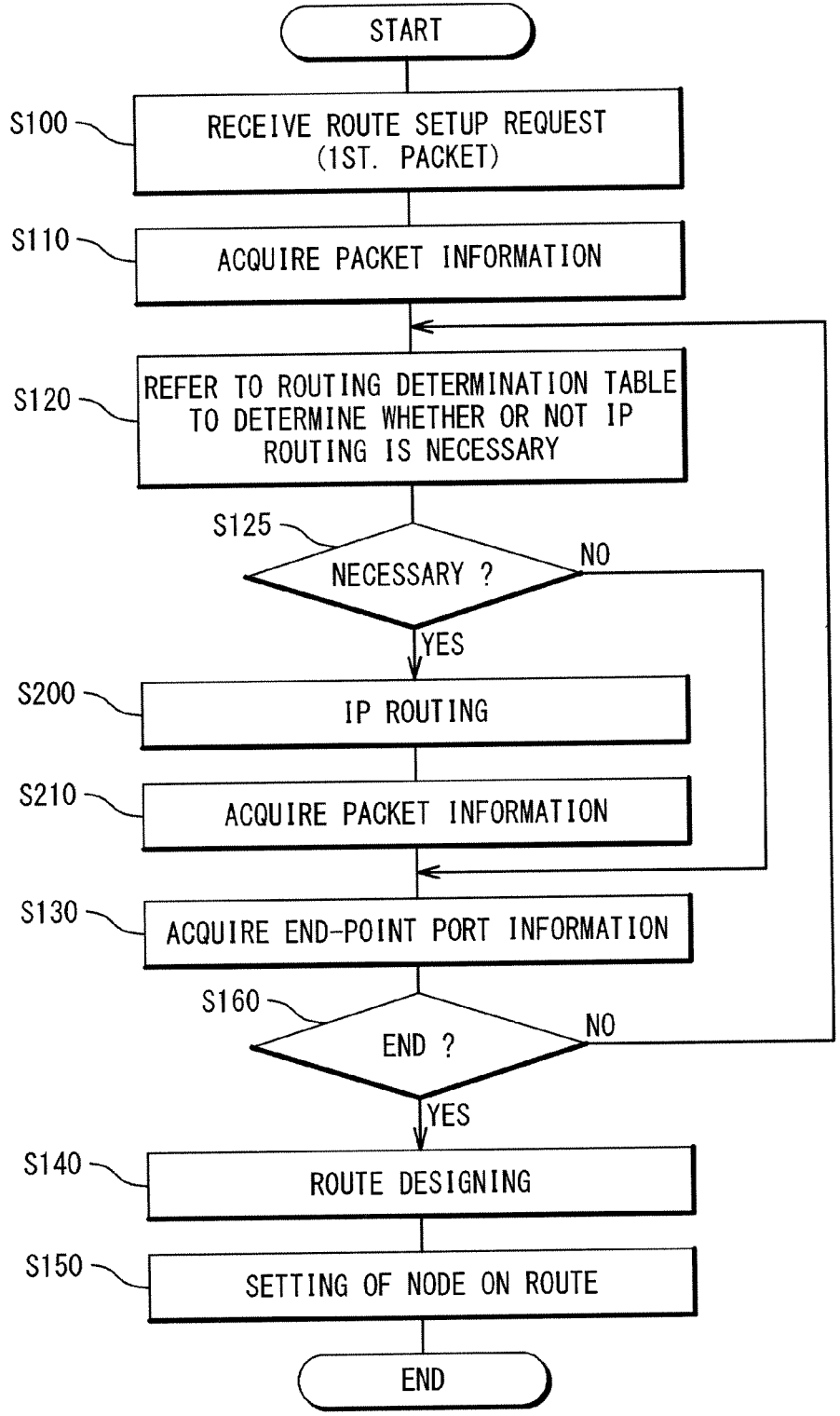
FIG. 8 is a flow chart showing a route setup method according to a second exemplary embodiment of the present invention.

FIG. 8 is a flow chart showing the route setup processing according to the second exemplary embodiment. According to the present exemplary embodiment, the end determination (Step S160) by the end determination unit 160 is performed following the Step S130. The repetition of the routing processing is performed as in the case of the first exemplary embodiment.

If the predetermined end condition is satisfied (Step S160; Yes), the processing proceeds to Step S140. At Step S140, the route designing unit 140 determines in a lump a communication route from the initial requestor node 5-1 to the last destination node. As shown in FIG. 6, the initial requestor node 5-1 is identified by the start-point port information "ID=#1, port=P10", and the last destination node is identified by the end-point port information "ID=#7, port=P71". Therefore, the route designing unit 140 can determine the communication route by referring to the topology information 310. It should be noted that the communication route does not necessarily go through the router nodes 5-2 and 5-5 in the present exemplary embodiment.

Lastly, at Step S150, the node setting unit 150 instructs each node 5 on the determined route to forward packets of the flow along the determined route. Moreover, the node setting unit 150 instructs the router node 5-7 to rewrite the header of the packet of the flow.

3. Third Exemplary Embodiment

In a third exemplary embodiment, a plurality of virtual networks are constructed on the communication network NET. The subnet configuration and the router node are different between the virtual networks. Therefore, the routing determination table 320 is prepared separately with respect to each virtual network.

Figure 9:
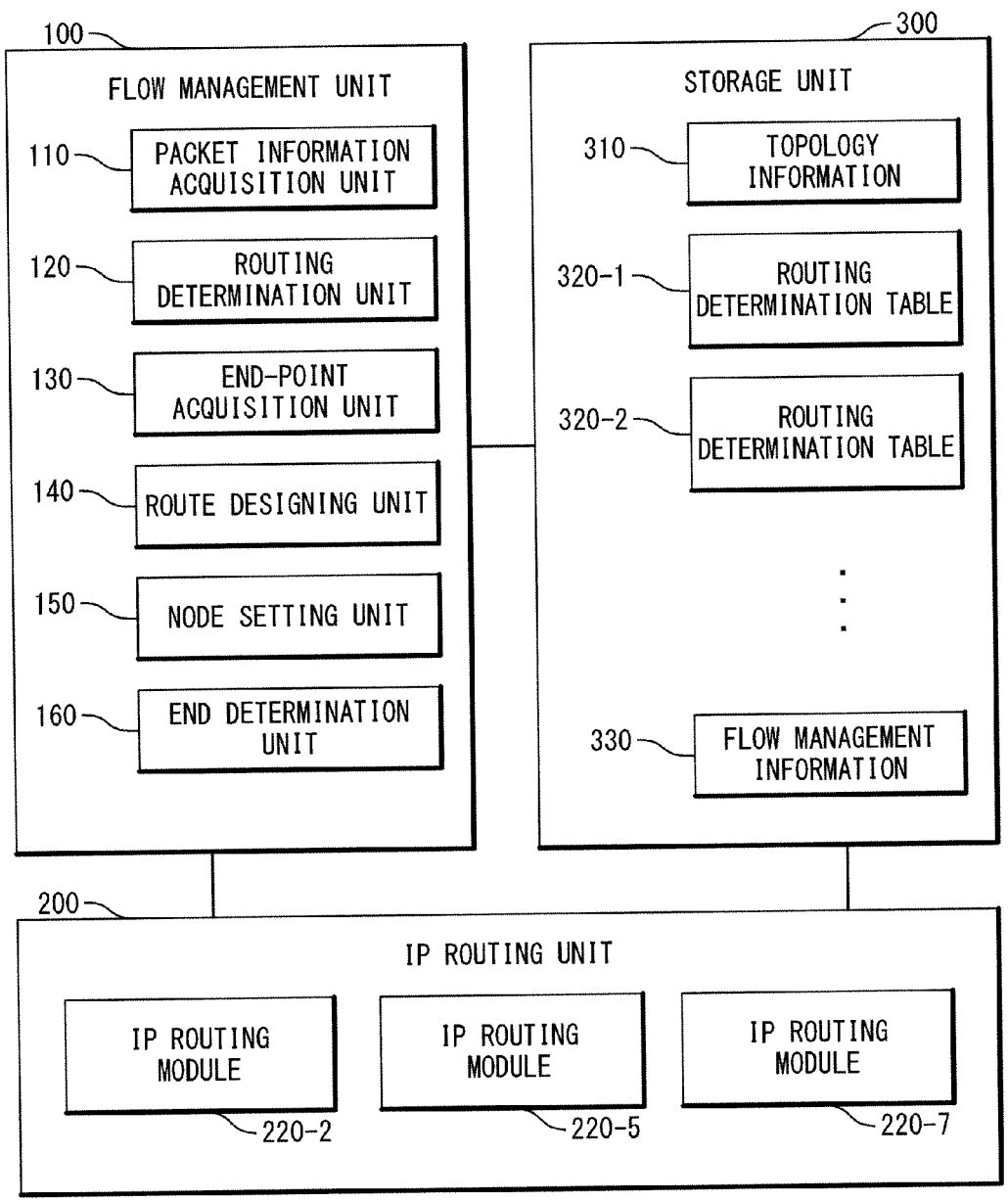
FIG. 9 is a block diagram showing a configuration of a route setup server according to a third exemplary embodiment of the present invention.

FIG. 9 shows a configuration of the route setup server 10 according to the third exemplary embodiment. As shown in FIG. 9, the routing determination tables 320-1, 320-2 . . . for the respective virtual networks are stored in the storage unit 300. When referring to the routing determination table 320, the flow management unit 100 identifies a virtual network to which a packet belongs, based on such information as the header of the packet and transit nodes. Then, the flow management unit 100 refers to the IP routing table 320 associated with the identified virtual network. The others are the same as in the case of the foregoing exemplary embodiments.

4. Fourth Exemplary Embodiment

FIG. 10 shows a configuration of the route setup server 10 according to a fourth exemplary embodiment. In the fourth exemplary embodiment, the configuration of the IP routing unit 200 is different from that in the foregoing exemplary embodiments. More specifically, the IP routing unit 200 has a destination determination unit 210, the IP routing modules 220-2, 220-5 and 220-7 and route tables 230-2, 230-5 and 230-7. The IP routing modules 220-2, 220-5 and 220-7 respectively update the route tables 230-2, 230-5 and 230-7, as necessary.

At Step S210, the destination determination unit 210 selects an appropriate route table 230 by referring to the IP address information. Then, the destination determination unit 210 performs the IP routing for the packet by using the selected route table 230 to update the packet header.

While the exemplary embodiments of the present invention have been described above with reference to the attached drawings, the present invention is not limited to these exemplary embodiments and can be modified as appropriate by those skilled in the art without departing from the spirit and scope of the present invention.

A part of or whole of the above-described exemplary embodiments can be described as in the following Supplementary notes but is not limited to those.

(Supplementary Note 1)

A route setup server that determines a communication route in a communication network including a plurality of nodes, said route setup server comprising:

a storage unit in which a routing determination table is stored, wherein said routing determination table indicates a router node assigned to an IP router among said plurality of nodes;

an IP routing unit comprising a software-based IP routing module with respect to each of said router node, wherein said software-based IP routing module has a same function as an IP router; and a flow management unit configured to receive a packet indicating a source IP address and a destination IP address of a flow as a route setup request and to determine a communication route of said flow in response to said route setup request, wherein in routing processing, said flow management unit refers to said routing determination table to check whether or not a requestor node of said route setup request corresponds to any of said router node, wherein if said requestor node corresponds to any of said router node, said IP routing unit performs IP routing for said packet by using said software-based IP routing module associated with said corresponding router node to update a header of said packet, wherein after said routing processing, said flow management unit updates said requestor node of said route setup request to a destination node designated by a destination MAC address of said packet, and wherein said flow management unit determines said communication route by repeating said routing processing.

(Supplementary Note 2)

The route setup server according to Supplementary note 1, wherein said flow management unit repeats said routing processing until said destination node satisfies a predetermined end condition.

(Supplementary Note 3)

The route setup server according to Supplementary note 1 or 2, wherein every time of said routing processing, said flow management unit determines a partial route that is a communication route from said requestor node to said destination node.

(Supplementary Note 4)

The route setup server according to Supplementary note 3, wherein said flow management unit further instructs each node on said determined partial route to forward a packet of said flow along said determined partial route.

(Supplementary Note 5)

The route setup server according to Supplementary note 2, wherein after the repetition of said routing processing is completed, said flow management unit determines a communication route from an initial requestor node to a last destination node.

(Supplementary Note 6)

The route setup server according to Supplementary note 5, wherein said flow management unit further instructs each node on said determined communication route to forward a packet of said flow along said determined communication route.

(Supplementary Note 7)

A communication network system comprising:

a communication network including a plurality of nodes; and a route setup server configured to determine a communication route in said communication network, wherein said route setup server comprises:

a storage unit in which a routing determination table is stored, wherein said routing determination table indicates a router node assigned to an IP router among said plurality of nodes;

an IP routing unit comprising a software-based IP routing module with respect to each of said router node, wherein said software-based IP routing module provides a same function as an IP router; and a flow management unit configured to receive a packet indicating a source IP address and a destination IP address of a flow as a route setup request and to determine a communication route of said flow in response to said route setup request, wherein in routing processing, said flow management unit refers to said routing determination table to check whether or not a requestor node of said route setup request corresponds to any of said router node, wherein if said requestor node corresponds to any of said router node, said IP routing unit performs IP routing for said packet by using said software-based IP routing module associated with said corresponding router node to update a header of said packet, wherein after said routing processing, said flow management unit updates said requestor node of said route setup request to a destination node designated by a destination MAC address of said packet, and wherein said flow management unit determines said communication route by repeating said routing processing.

(Supplementary Note 8)

A route setup method that determines a communication route in a communication network including a plurality of nodes, said route setup method comprising:

storing a routing determination table that indicates a router node assigned to an IP router among said plurality of nodes, in a memory device;

receiving a packet indicating a source IP address and a destination IP address of a flow as a route setup request; and determining a communication route of said flow in response to said route setup request, wherein a software-based IP routing module having a same function as an IP router is provided with respect to each of said router node, wherein said determining said communication route comprises:

performing routing processing comprising:

checking whether or not a requestor node of said route setup request corresponds to any of said router node, by referring to said routing determination table; and performing, if said requestor node corresponds to any of said router node, IP routing for said packet by using said software-based IP routing module associated with said corresponding router node to update a header of said packet;

updating, after said routing processing, said requestor node of said route setup request to a destination node designated by a destination MAC address of said packet; and determining said communication route by repeating said routing processing.

(Supplementary Note 9)

A route setup program recorded on a tangible computer-readable medium that, when executed, causes a computer to perform route setup processing that determines a communication route in a communication network including a plurality of nodes, said route setup processing comprising:

storing a routing determination table that indicates a router node assigned to an IP router among said plurality of nodes, in a memory device;

receiving a packet indicating a source IP address and a destination IP address of a flow as a route setup request; and determining a communication route of said flow in response to said route setup request, wherein a software-based IP routing module having a same function as an IP router is provided with respect to each of said router node, wherein said determining said communication route comprises:

performing routing processing comprising:

checking whether or not a requestor node of said route setup request corresponds to any of said router node, by referring to said routing determination table; and performing, if said requestor node corresponds to any of said router node, IP routing for said packet by using said software-based IP routing module associated with said corresponding router node to update a header of said packet;

updating, after said routing processing, said requestor node of said route setup request to a destination node designated by a destination MAC address of said packet; and determining said communication route by repeating said routing processing.

This application is based upon and claims the benefit of priority from Japanese patent application No. 2009-077318, filed on Mar. 26, 2009, the disclosure of which is incorporated herein in its entirely by reference.

The invention claimed is:

1. A route setup server that determines a communication route in a communication network including a plurality of nodes, said route setup server comprising:
a storage unit in which a routing determination table is stored, wherein said routing determination table indicates a router node assigned to an IP router among said plurality of nodes;
an IP routing unit comprising a software-based IP routing module with respect to each of said router node, wherein said software-based IP routing module has a same function as an IP router; and
a flow management unit configured to receive a packet indicating a source IP address and a destination IP address of a flow as a route setup request and to determine a communication route of said flow in response to said route setup request,
wherein in routing processing, said flow management unit refers to said routing determination table to check whether or not a requestor node of said route setup request corresponds to said router node,
wherein, if said requestor node corresponds to said router node, said IP routing unit performs IP routing for said packet by using said software-based IP routing module associated with said corresponding router node to update a header of said packet,
wherein, after said routing processing, said flow management unit updates said requestor node of said route setup request to a destination node designated by a destination media access control (MAC) address of said packet, and
wherein said flow management unit determines said communication route by repeating said routing processing.

2. The route setup server according to claim 1, wherein said flow management unit repeats said routing processing until said destination node satisfies a predetermined end condition.

3. The route setup server according to claim 1, wherein every time said routing processing is performed, said flow management unit determines a partial route that includes a communication route from said requestor node to said destination node.

4. The route setup server according to claim 3, wherein said flow management unit further instructs each node on said determined partial route to forward a packet of said flow along said determined partial route.

5. The route setup server according to claim 2, wherein, after the repetition of said routing processing is completed, said flow management unit determines a communication route from an initial requestor node to a last destination node.

6. The route setup server according to claim 5, wherein said flow management unit further instructs each node on said determined communication route to forward a packet of said flow along said determined communication route.

7. A communication network system, comprising:
a communication network including a plurality of nodes; and
a route setup server configured to determine a communication route in said communication network,
wherein said route setup server comprises:
a storage unit in which a routing determination table is stored, wherein said routing determination table indicates a router node assigned to an IP router among said plurality of nodes;
an IP routing unit comprising a software-based IP routing module with respect to each of said router node, wherein said software-based IP routing module provides a same function as an IP router; and
a flow management unit configured to receive a packet indicating a source IP address and a destination IP address of a flow as a route setup request and to determine a communication route of said flow in response to said route setup request,
wherein in routing processing, said flow management unit refers to said routing determination table to check whether or not a requestor node of said route setup request corresponds to said router node,
wherein if said requestor node corresponds to said router node, said IP routing unit performs IP routing for said packet by using said software-based IP routing module associated with said corresponding router node to update a header of said packet,
wherein, after said routing processing, said flow management unit updates said requestor node of said route setup request to a destination node designated by a destination media access control (MAC) address of said packet, and
wherein said flow management unit determines said communication route by repeating said routing processing.

8. A route setup method that determines a communication route in a communication network including a plurality of nodes, said route setup method comprising:
storing a routing determination table that indicates a router node assigned to an IP router among said plurality of nodes, in a memory device;
receiving a packet indicating a source IP address and a destination IP address of a flow as a route setup request; and
determining a communication route of said flow in response to said route setup request,
wherein a software-based IP routing module having a same function as an IP router is provided with respect to each of said router node,
wherein said determining said communication route comprises:
performing routing processing comprising:
checking whether or not a requestor node of said route setup request corresponds to said router node, by referring to said routing determination table; and
performing, if said requestor node corresponds to said router node, IP routing for said packet by using said software-based IP routing module associated with said corresponding router node to update a header of said packet;
updating, after said routing processing, said requestor node of said route setup request to a destination node designated by a destination media access control (MAC) address of said packet; and
determining said communication route by repeating said routing processing.

9. A route setup program recorded on a tangible computer-readable medium that, when executed, causes a computer to perform route setup processing that determines a communication route in a communication network including a plurality of nodes, said route setup processing comprising:
storing a routing determination table that indicates a router node assigned to an IP router among said plurality of nodes, in a memory device;
receiving a packet indicating a source IP address and a destination IP address of a flow as a route setup request; and
determining a communication route of said flow in response to said route setup request,
wherein a software-based IP routing module having a same function as an IP router is provided with respect to each of said router node, wherein said determining said communication route comprises:
  performing routing processing comprising:
    checking whether or not a requestor node of said route setup request corresponds to said router node, by referring to said routing determination table; and
    performing, if said requestor node corresponds to said router node, IP routing for said packet by using said software-based IP routing module associated with said corresponding router node to update a header of said packet;
  updating, after said routing processing, said requestor node of said route setup request to a destination node designated by a destination media access control (MAC) address of said packet; and
  determining said communication route by repeating said routing processing.

10. The route setup server according to claim 1, wherein the route setup server is devoid of relaying packets.

11. The route setup server according to claim 1, wherein the route setup server determines the communication route and configures routers in the communication route for being relayed packets as a same flow.

12. The route setup server according to claim 1, wherein the route setup server only determines the communication route and configures routers in the communication route for being relayed packets as a same flow.

13. The route setup server according to claim 1, wherein the route setup server is not in the communication route.

14. The communication network system according to claim 7, wherein the route setup server is devoid of relaying packets.

15. The communication network system according to claim 7, wherein the route setup server only determines the communication route and configures routers in the communication route for being relayed packets as a same flow.

16. The communication network system according to claim 7, wherein the route setup server is not in the communication route.

17. The route setup method according to claim 8, wherein the route setup server is devoid of relaying packets, and
  wherein the route setup server is not in the communication route.

18. The route setup method according to claim 8, wherein the route setup server only determines the communication route and configures routers in the communication route for being relayed packets as a same flow.

19. The route setup program according to claim 9, wherein the route setup server is devoid of relaying packets, and
  wherein the route setup server is not in the communication route.

20. The route setup program according to claim 9, wherein the route setup server only determines the communication route and configures routers in the communication route for being relayed packets as a same flow.

\* \* \* \* \*